Patented Nov. 27, 1951

2,576,901

UNITED STATES PATENT OFFICE 2,576,901

PREPARATION OF DELTA-VALERO-
LACTONES

Henry W. de Jong, Berkeley, Calif., assignor to
Shell Development Company, Emeryville, Calif.,
a corporation of Delaware No Drawing. Application October 16, 1950,
Serial No. 190,435

11 Claims. (Cl. 260—344)

This invention relates to a process for the preparation of lactones, and it more particularly relates to a process for the production of substituted delta-valerolactones.

The delta-valerolactones substituted at the alpha and gamma carbon atoms by aliphatic hydrocarbon groups, such as alkyl groups containing from 1 to 8 carbon atoms, and at the gamma carbon atom by an etherified hydroxymethyl group, are of potential commercial importance because of their properties which adapt them to use, inter alia, as perfume ingredients, as improved high-boiling solvents and plasticizers and as chemical intermediates. The present invention relates to a new and improved process for the production of these useful compounds.

It has been unexpectedly discovered in accordance with the present invention that such substituted delta-valerolactones can be produced directly, in high yields and in a generally improved manner, by condensing an alpha-methylene aldehyde containing at least 4 carbon atoms with an alcohol in the presence of a basic condensation catalyst under substantially anhydrous conditions and then fractionally distilling the condensation mixture in the presence of a basic condensation catalyst, which most conveniently may be the same catalyst as that used for the condensation. The reaction, which was most unexpected, goes substantially as follows:

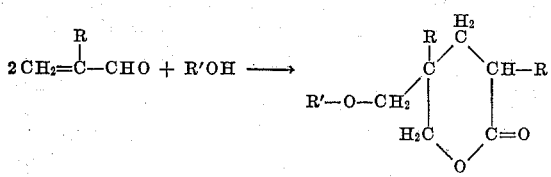

In this equation, R is an aliphatic radical, preferably an alkyl group containing from 1 to 8 carbon atoms, and R'OH is an alcohol.

The above reaction can be effected in accordance with a specific embodiment of the invention by mixing an alpha-methylene aldehyde containing at least 4 carbon atoms with an alcohol, reacting the two materials in the liquid state in the presence of a non-resinifying amount of an added non-volatile alkali, preferably a mineral alkali, or other basic condensation catalyst, and then distilling the resulting mixture in the presence of the basic condensation catalyst, preferably under reduced pressure. The desired substituted delta-valerolactone, which under reduced pressures generally comes over in the distillate, can be recovered by separating a suitable fraction from the distillate according to the boiling point of the desired lactone. The reaction between the alpha-methylene aldehyde and the alcohol may be conducted in the presence of added inert solvents, or the alcohol may be used in excess and the amount above that required for the reaction may serve as a solvent medium. Polymerization inhibitors, such as hydroquinone, may be employed to reduce possible ethylenic polymerization of the unsaturated aldehyde reactant.

Although the alpha-methylene aldehyde and the alcohol may be used in various proportions, the alcohol preferably is employed in molar excess relative to the alpha-methylene aldehyde, and an especially effective range of proportions is from about 2 to about 10 moles of alcohol per mole of the alpha-methylene aldehyde. Larger amounts of the alcohol can be used, up to, say, 25 or more moles per mole of the alpha-methylene aldehyde, although somewhat less desirably because of the attendant greater dilution of the reaction mixture.

As the basic condensation catalyst, a basic-acting substance, such as a hydroxide or carbonate of an alkaline earth metal or other basic compound of an alkali metal, e. g., an alkali metal alcoholate, or an alkaline earth metal hydroxide or oxide, or an organic amine, such as pyridine, benzyltrimethylammonium hydroxide, piperidine, or tetramethylammonium hydroxide, can be employed. The non-volatile mineral alkalies, such as the hydroxides and the carbonates of sodium, potassium and lithium and the hydroxides of the alkaline earth metals, e. g., of calcium and of barium, are preferred. The catalyst suitably is employed in amounts to provide concentrations in the reaction mixture of from about 0.001 to about 0.4 gram-equivalents per liter, a preferred range being from about 0.01 to about 0.08 gram equivalents per liter. In any case, the amount of the basic-acting substance should be less than that that would cause undesired polymerization or resinification of the reactive unsaturated aldehyde reactant.

During the condensation of the alpha-methylene aldehyde with the alcohol the temperature of the reaction mixture preferably is maintained within the range of from about 0° C. to about 100° C., temperatures not over about 70° C. being preferred. Since the condensation reaction is exothermic, cooling may be necessary to maintain the desired temperature. The temperature of the reaction mixture can be kept under control, and the condensation effectively carried out by first dissolving or suspending the basic catalyst in the alcohol, and then adding the alpha-methylene aldehyde to the mixture at a controlled rate not substantially greater than the rate of its consumption in the ensuing reaction. Reaction times of from about ½ to about 4 hours are usually adequate.

The desired substituted delta-valerolactones are obtained according to the invention simply by distilling the condensation mixture, preferably at such pressures that the temperature of the distilland is above about 70° C., preferably from about 80° C. to about 175° C., and necessarily in the presence of a basic condensation catalyst, preferably the same basic condensation catalyst or at least a substantial part thereof. The distillation may be commenced when the condensation reaction has gone to completion, as judged by cessation of evolution of heat in the condensation mixture, or it may be commenced at any suitable time prior thereto. When the pressure and temperature during the distillation are adjusted according to the boiling point of the particular substituted delta-valerolactone formed from the selected reactants, the desired product comes over in the distillate and may be separated therefrom by fractionation.

The process of the invention can be carried out batchwise, or it can be practiced in a continuous manner. In continuous operations, for example, the mixture comprising the alcohol, the basic catalyst and the alpha-methylene aldehyde may be passed through a reaction zone maintained at the desired temperature, such as a stirred vessel or a reaction tube, and thence directly into a suitable fractionating column from which unreacted aldehyde, unreacted alcohol, and lactone may be taken as separate fractions, and a higher-boiling portion containing the catalyst taken as bottoms. Unreacted reactants may be recycled.

The following examples will illustrate the process of the invention. It will be understood that the examples are presented as being representative of the various possible specific embodiments of the process and without intent to limit the invention as it is defined in the appended claims. It is our intent to claim the invention, in letter and in spirit, as broadly as the prior art permits.

*Example I*

To a 22-liter glass flask there are charged 7200 grams of methyl alcohol and 670 cc. of a 0.496 N solution of NaOH in methanol. While the solution is stirred vigorously, 5600 grams of methacrolein (containing 0.01% of hydroquinone) are added at such a rate that the temperature of the mixture remains at about 30° C., cooling water being run over the outside of the flask to assist in the removal of heat. After the addition of the methacrolein, which takes about 4 hours, the mixture is stirred at 30° C. for an additional hour. The mixture then is charged to a nickel kettle equipped with a packed glass fractionating column. Excess methanol is distilled off at a pressure of 300 mm. Hg after which the pressure is reduced to 5 mm. Hg and the distillation continued at 90° C. to 95° C. Substantially pure alpha, gamma - dimethyl - gamma - methoxy - methyl-delta-valerolactone is recovered as a separate fraction of the distillate in a yield corresponding to 61% based upon the amount of methacrolein applied.

*Example II*

To a glass 30-liter flask there are charged 11,000 grams of ethyl alcohol containing 31 grams of dissolved KOH. While the solution is stirred vigorously, there are added 5600 grams of methacrolein (containing 0.01% of hydroquinone), the temperature of the mixture being held at 30° C. by regulation of the rate of addition of the methacrolein and by external cooling of the flask. When addition of the methacrolein is completed, the mixture is run into a nickel still-kettle and distilled under reduced pressure through a glass fractionating column. After excess ethyl alcohol is taken off as a forerun, the distillation is continued under a pressure of about 1 mm. Hg to a kettle temperature of about 95° C. to 100° C. Alpha, gamma-dimethyl-gamma-ethoxymethyl-delta-valerolactone is recovered in a yield of about 60%, based upon the methacrolein charged, as the fraction distilling at about 95° C. to 96° C.

Although in the preceding examples methacrolein and methyl alcohol and ethyl alcohol were employed, other alpha-methylene aldehydes containing at least 4 carbon atoms and other alcohols may be employed with equivalent results. The alpha-methylene aldehydes containing at least 4 carbon atoms, which are characterized by the essential presence of a tertiary olefinic carbon atom adjacent to the formyl group, are represented by methacrolein, alpha-ethylacrolein, alpha-isopropylacrolein, alpha-isobutylacrolein, alpha-neopentylacrolein, alpha - hexylacrolein, the alpha-heptylacroleins and alpha-octylacroleins, and like unsaturated aldehydes containing an unsubstituted methylene group ($CH_2=$) directly linked to the alpha carbon atom and an aliphatic group, such as an alkyl or substituted alkyl group, additionally bonded to said alpha carbon atom. When the foregoing and like alpha-methylene aldehydes in which the alpha carbon atom is tertiary are employed in the process of the invention, the methyl groups linked to the lactone nucleus in the illustrated products will be replaced by the radical that is singly bonded to the alpha carbon atom of the aldehyde reactant; for example, from alpha-ethylacrolein and methanol there is obtained alpha, gamma-diethyl-gamma-methoxymethyl-delta-valerolactone, while from alpha-isobutylacrolein and isopropyl alcohol there is obtained alpha, gamma - diisobutyl - gamma-isopropoxymethyl-delta-valerolactone.

The alcohol may in general be any relatively low molecular weight alcohol, containing, for example, up to 10 carbon atoms, free from interfering substituents. Alcohols that may be employed in the process of the invention include not only the lower saturated alcohols, such as methyl, ethyl, propyl, isopropyl, butyl, sec.-butyl, the amyl, the hexyl, the heptyl, and the octyl alcohols and like monohydric saturated alcohols, but, as well, unsaturated alcohols, such as allyl, methallyl, crotyl, propargyl, and cinnamyl alcohols, 4-methyl-3-penten-2-ol and cyclohexenol, and substituted alcohols, such as 2-methoxyethanol, ethylene glycol, and diethylaminoethanol. When alcohols other than the methyl alcohol and the ethyl alcohol shown in the foregoing examples are employed, the methoxy or ethoxy group of the illustrated product is replaced by the corresponding residue of the alcohol reactant, as will be apparent from the general equation for the reaction described hereinbefore.

While I do not wish to be limited according to any theory, it appears that a possible mechanism for the formation of the substituted delta-lactones in the process of the invention can be accounted for by an initial condensation reaction between the alpha-methylene aldehyde and the alcohol to form a substituted glutaraldehyde, thusly,

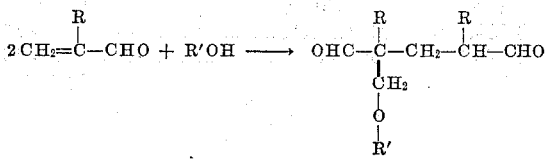

which then, upon the heating in the presence of a basic condensation catalyst during the distillation, is converted by intramolecular rearrangement to the desired lactone, e. g.,

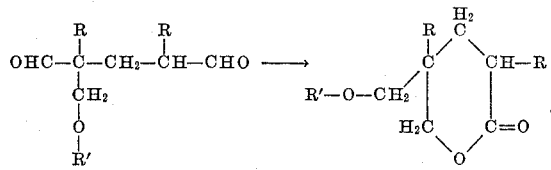

In fact, it has been found to be possible to effect the direct conversion of such substituted glutaraldehyde to lactones according to the second of the above equations by heating in the presence of basic condensation catalysts, such as a basic compound of an alkali metal, at temperatures involved in the distillation step of the herein-disclosed process. The present process, by effecting these two reactions in the manner described, provides a unitary, direct, and efficient process for the production of such delta-lactones from alpha-methylene aldehydes containing at least 4 carbon atoms and alcohols. Among the advantages of the new process are that it requires the use of but a single added catalyst, that it can be carried out without isolation or separation of any intermediate products, that high yields of desired product are obtained, and that it is particularly adaptable to operation in a continuous, large-scale manner.

I claim as my invention:

1. A process for the production of alpha,-gamma - dimethyl - gamma - methoxymethyl - delta-valerolactone which comprises adding about one mole of methacrolein to a solution of about 0.04 mole of NaOH in about three moles of methyl alcohol while maintaining the temperature of the mixture at about 30° C., distilling the resulting mixture to a distilland temperature of about 90° C. to 95° C. under about 5 mm. Hg pressure, and fractionating said alpha,gamma-dimethyl-gamma-methoxymethyl-delta-valerolactone from the distillate vapors.

2. A process for the production of alpha,-gamma - dimethyl - gamma - ethoxymethyl - delta-valerolactone which comprises adding about one mole of methacrolein to a solution of about 0.04 mole of KOH in about three moles of ethyl alcohol while maintaining the temperature of the mixture at about 30° C., distilling the resulting mixture to a distillant temperature of about 95° C. to 100° C. under about 1 mm. Hg pressure, and fractionating said alpha,gamma-dimethyl-gamma-ethoxymethyl-delta-valerolactone from the distillate vapors.

3. A process for the production of an alpha,-gamma - dimethyl - gamma - alkoxymethyl - delta-valerolactone which comprises condensing methacrolein with a lower aliphatic monohydric alcohol in liquid phase in the presence of a non-volatile mineral alkali at a temperature of from about 0° C. to about 70° C., distilling the resulting mixture in the presence of the non-volatile mineral alkali to a distillant temperature of at least about 70° C., and separating a fraction comprising said alpha,gamma - dimethyl - gamma - alkoxy - methyl-delta-valerolactone from the distillate vapors.

4. A process for the production of an alpha,-gamma-dimethyl - gamma - alkoxymethyl-delta-valerolactone which comprises condensing methacrolein with a lower aliphatic monohydric alcohol in liquid phase in the presence of a basic condensation catalyst at a temperature of from about 0° C. to about 70° C., distilling the mixture in the presence of a basic condensation catalyst to a distilland temperature of at least about 70° C., and separating a fraction comprising said alpha,gamma-dimethyl-gamma - alkoxymethyl - delta-valerolactone from the distillate vapors.

5. A process for the production of an alpha,-gamma-dialkyl-gamma- alkoxymethyl-delta-valerolactone which comprises condensing an alpha-methylene alkanal containing at least four carbon atoms with a lower aliphatic monohydric alcohol present in an amount corresponding to from about two to about ten moles of the alcohol per mole of the alpha-methylene alkanal at a temperature of from about 0° C. to about 100° C. in the presence of a basic condensation catalyst, distilling the resulting mixture in the presence of a basic condensation catalyst to a distilland temperature of at least about 70° C., and separating a fraction comprising said alpha,gamma-dialkyl-gamma - alkoxymethyl - delta-valerolactone from the distillate vapors.

6. A process for the production of alpha,gamma-dimethyl-alpha- methoxymethyl-delta-valerolactone, said process comprising heating to a temperature above about 70° C. in the presence of a small amount, up to about 0.4 gram-equivalents per liter, of a basic catalyst the crude product of the condensation of methacrolein with methyl alcohol in the presence of a basic condensation catalyst at temperatures within the range of from about 0° C. to about 70° C.

7. A process for the production of an alpha,-gamma-dialkyl-gamma- alkoxymethyl-delta-valerolactone, said process comprising heating at a temperature above about 70° C. in the presence of a small amount, up to about 0.4 gram-equivalents per liter, of a basic catalyst a crude product of the condensation of an alpha-methylene alkanal containing at least four carbon atoms with an alcohol in the presence of a basic condensation catalyst at temperatures within the range of from about 0° C. to about 70° C.

8. A process for the production of an alpha,-gamma-dialkyl-gamma- alkoxymethyl-delta-valerolactone, which process comprises heating an alpha,gamma-dialkyl - alpha - alkoxymethyl-glutaraldehyde in the presence of a basic condensation catalyst at a temperature above about 70° C.

9. A process for the production of alpha,gamma-dimethyl-gamma- alkoxymethyl-delta-valerolactone, which process comprises heating alpha,-gamma-dimethyl - alpha-alkoxymethyl-glutaraldehyde in the presence of a basic compound of an alkali metal at a temperature above about 70° C.

10. A process for the production of a substituted delta-valerolactone, said process comprising condensing methacrolein and an alcohol in the presence of a basic condensation catalyst and distilling the condensate in the presence of a basic condensation catalyst at a distilland temperature above about 70° C.

11. A process for the production of a substituted delta-valerolactone, said process comprising condensing an alpha-methylene aldehyde containing at least four carbon atoms and an alcohol in the presence of a basic condensation catalyst and distilling the condensate in the presence of a basic condensation catalyst at a distilland temperature above about 70° C.

HENRY W. DE JONG.

REFERENCES CITED

The following references are of record in the file of this patent:

UNITED STATES PATENTS

| Number | Name | Date |
|---|---|---|
| 2,401,776 | Rothrock | June 11, 1946 |
| 2,526,702 | Smith | Oct. 24, 1950 |